United States Patent [19]

Yamamoto

[11] 3,729,723

[45] Apr. 24, 1973

[54] MEMORY CIRCUIT

[75] Inventor: Hirohiko Yamamoto, Minato-ku, Tokyo, Japan

[73] Assignee: Nippon Electric Company, Limited, Tokyo, Japan

[22] Filed: Nov. 1, 1971

[21] Appl. No.: 194,680

[30] Foreign Application Priority Data

Nov. 5, 1970 Japan ................................45/96829

[52] U.S. Cl. .................340/173 R, 307/238, 307/279

[51] Int. Cl. .............................................G11c 11/40

[58] Field of Search ..............................307/238, 279; 340/173 FF, 173 R

[56] References Cited

UNITED STATES PATENTS 3,286,189 11/1966 Mitchell ..............................307/279

3,521,141 7/1970 Walton ..............................340/173 R

*Primary Examiner*—Terrell W. Fears
*Attorney*—Sandoe, Hopgood and Calimafde

[57] ABSTRACT

A memory circuit, which is preferably of integrated circuit construction, includes three insulated gate field effect transistors. Data is stored by the capacitance between the drain and source of the first transistor. Information inputs are supplied to an input terminal and then through the drain and source electrodes of the second and third transistors to the gate electrode of the first transistor. The second and third transistors are conductive only when a gate signal, which preferably is a pulsed timing signal, is applied to their gate electrodes. This circuit provides added protection against loss of information due to spurious signals reaching the input terminal.

3 Claims, 4 Drawing Figures

Patented April 24, 1973 3,729,723

INVENTOR
HIROHIKO YAMAMOTO by
Sandoe, Hopgood & Calimafde
ATTORNEYS

MEMORY CIRCUIT

BACKGROUND OF THE INVENTION

This invention relates to a memory circuit and, more particularly, to a new and improved temporary memory circuit that utilizes insulated gate field effect transistors.

A well known temporary memory circuit arrangement includes a load means and two insulated gate field effect transistors (IGFET's) the gate impedance of which has a large capacitance and a very high resistance. In this circuit the source electrode of a first IGFET is grounded, the drain electrode of the first IGFET is connected, through a resistive load, to a power source and the gate electrode of the first IGFET is connected to the drain electrode of a second IGFET. An input data signal is applied through an input terminal to the source electrode of the second IGFET when a timing signal is applied to the gate electrode of the second IGFET, and the data is stored in the first IGFET by utilizing its gate capacitance.

A conventional temporary memory circuit of this type is vulnerable to noise signals attributable to, for example, transistory phenomena occuring in surrounding curcuits. Such noise signals are frequently present at the input terminal of the circuit. If the noise has a polarity opposite that of the input data signal, the second IGFET is rendered conductive despite the absence of the timing pulse (gate signal), thus affecting the data signal stored in the first IGFET.

The object of this invention is to provide a temporary memory circuit which is not adversely affected by such noise signals.

SUMMARY OF THE INVENTION

The memory circuit of this invention comprises a first IGFET having source and drain electrodes adapted to be connected across a potential difference. The drain electrode of a second IGFET is connected to the gate electrode of the first IGFET, and the drain electrode of a third IGFET is connected to the source electrode of the second IGFET. The gate electrodes of the second and third IGFET's are adapted for connection to a gate signal source. An information input terminal is connected to the source electrode of the third IGFET.

Preferably, the gate signal is a pulsed signal derived from a timing signal generation means. A resistive load means and an output terminal are connected to the drain electrode of the first IGFET. A power supply means is provided for applying a potential difference across the source and drain electrodes of the first IGFET.

This memory circuit is capable of withstanding a noise signal which is opposite in polarity to the input data signal because the junction between the source region and the substrate of the third IGFET is forward biased by the noise signal, thus injecting minority carriers into the substrate. Most of the injected minority carriers recombine in the substrate and do not reach the drain region of the second IGFET. Although some of the injected carriers reach the drain region of the third IGFET, a substantial current does not flow between the gate of the first IGFET and the input terminal unless a gate signal is present.

BRIEF DESCRIPTION OF THE DRAWINGS

For a more complete explanation of the invention, reference can be made to the following detailed description taken in conjunction with the accompanying figures of the drawings in which.

DESCRIPTION OF THE PREFERRED EMBODIMENTS

Figures 1, 2, 3, 4:
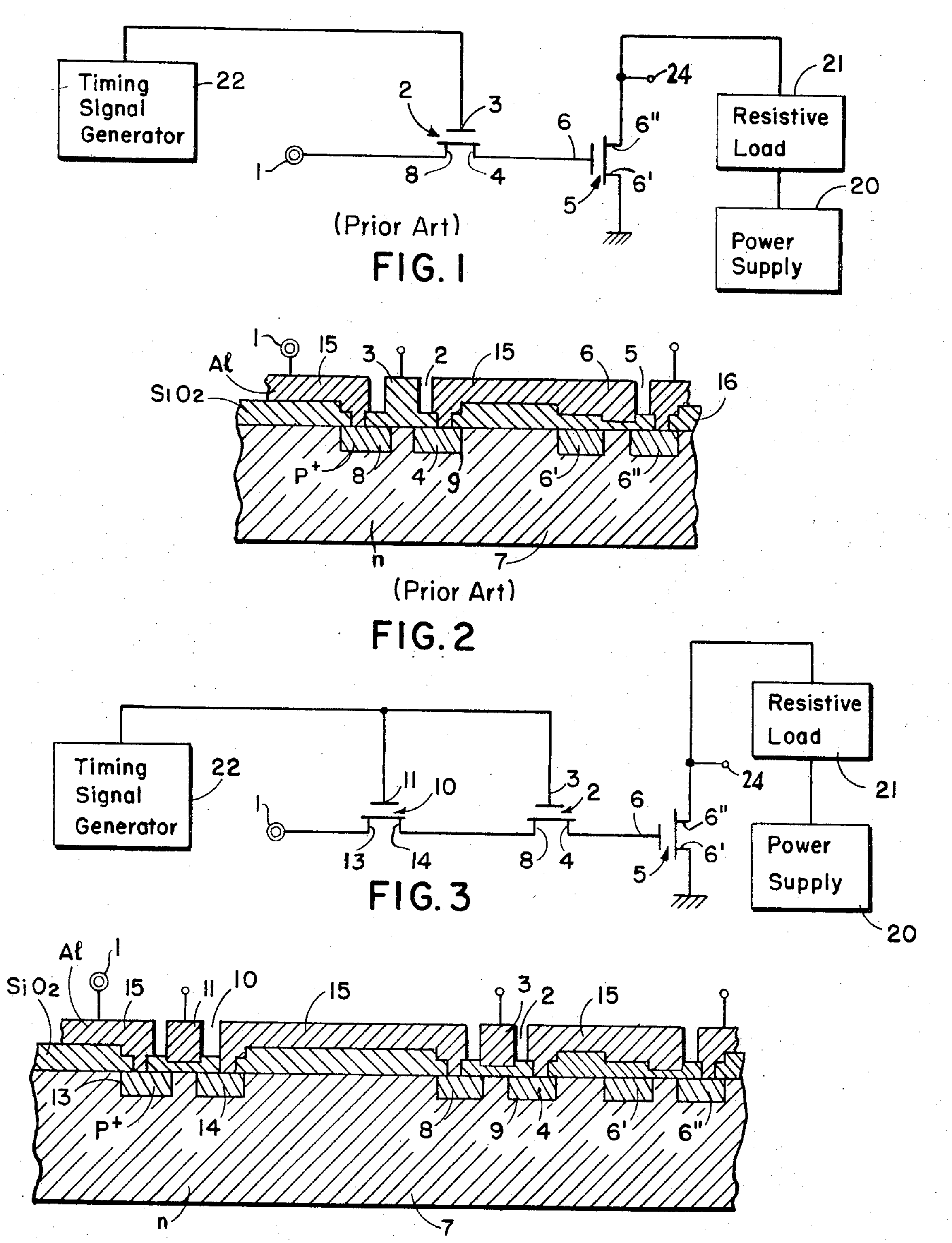
FIG. 1 is a schematic diagram of a conventional temporary memory circuit.
FIG. 2 is a cross-sectional view of an integrated circuit device constructed in accordance with the circuit of FIG. 1.
FIG. 3 is a schematic diagram of a temporary memory circuit constructed in accordance with the present invention.
FIG. 4 is the cross-sectional view of an integrated circuit device constructed in accordance with he circuit of FIG. 3.

FIG. 1 shows a conventional temporary memory circuit which is illustrated and described here to facilitate an understanding of the invention. It includes a first IGFET 5 in which the source 6' is grounded, and the drain 6'' is connected to a power source 20 through a resistive load means 21. The load means 21 may be, for example, a resistor having a highly doped region or an additional IGFET connected in series. An output terminal 24 is also connected to the drain 6'' of the first IGFET 5.

The gate 6 of the first IGFET 5 is connected to the drain 4 of a second IGFET 2, and an input terminal 1 is connected to the source 8 of the second IGFET 2.

Gate signals from a timing signal generator 22 are applied to the gate 3 of the second IGFET 2 whereby it is periodically rendered conductive. While a timing pulse is present, an input data signal is applied to the input terminal 1 and, thus, to the gate 6 of the first IGFET 5. These timing pulses cannot pass through the second IGFET 2 unless a timing pulse is present at the gate 3. The input data signal is stored in the first IGFET 5, primarily due to its gate capacitance. The potential across the gate 6 is intended to be held constant, in the absence of a timing pulse, irrespective of the presence or absence of an input signal at the input terminal 1.

The temporary memory circuit shown in FIG. 1 is conventionally manufactured in the form of an integrated circuit of the type shown in FIG. 2. The N-type silicon substrate 7 has four $p^+$ regions and a silicon dioxide layer 16 on one main surface. These $p^+$ regions form the source 6' and the drain 6'' of the first IGFET 5, and the source 8 and the drain 4 of the second IGFET 2, respectively. Openings for interconnections are formed in the silicon dioxide layer 16. A plurality of aluminum interconnections 15 and an aluminum gate 3 are formed on the silicon dioxide layer 16 and in the openings 15 by aluminum evaporation and photo-etching. The source 8 is connected to the input terminal 1 through one of the aluminum interconnections 15.

If, in a conventional temporary memory circuit of this type, a noise signal of negative polarity is applied to the input terminal 1 in the absence of a timing pulse, the junction between the source 8 and the substrate 7 is reverse biased. Accordingly, there is no substantial injection of holes into the substrate 7 and the information represented by the potential of the gate 6 is not affected. If, however, the noise is of positive polarity, the junction between the source 8 and the substrate 7 is forward biased injecting holes into the substrate 7. Some of these injected holes reach the drain 4, and the second IGFET 2 is thus driven into a conductive state. In this instance, the charge stored in the first IGFET 5 is discharged across the junction 9 between the drain 4 and the substrate 7.

It is thus clear that information stored in a conventional two IGFET temporary memory circuit can be lost due to spurious positive signals at the input terminal 1 despite the absence of timing pulses. If the distance between source 8 and drain 4 of the second IGFET 2 is increased to insure recombination of all or most of the injected holes with electrons in substrate 7 before reaching the drain 4, the switching speed of the circuit is reduced accordingly.

I have found, empirically, that the data stored in the first IGFET 5 is lost if a +1 volt signal is applied through a 50 kilo ohm resistor to the input terminal 1 of a memory device having the source 8 and the drain 4 separated by a distance of 80 microns. A similar undesirable effect on stored data has been observed in the case of a memory circuit of the type shown in FIG. 1 utilizing a combination of seperate conventional circuit components instead of integrated circuit construction.

An embodiment of the temporary memory circuit of the present invention is shown in FIG. 3 in which a third IGFET 10 is disposed between the input terminal 1 and the source 8 of the conventional temporary memory circuit shown in FIG. 1 (components common to FIGS. 1 and 2 are designated by the same numbers in FIGS. 3 and 4). The storage operation of this circuit is basically similar to that of the circuit shown in FIG. 1. Gate signals from a timing signal generator 22 are applied to the gate 3 of the second IGFET 2 and to the gate 11 of the third IGFET 10. Thus, the conductivity of the third IGFET 10 corresponds with respect to time to the conductivity of the second IGFET 2. In contradistinction to the memory circuit of FIG. 1, spurious signals applied to the input terminal 1 do not cause the source 13 of the first IGFET 5 to be conductively connected to the drain 4. This is because the carriers injected from the source 13 into the substrate as the result of incoming noise signals recombine before reaching the drain 4. Therefore, the undesired effect of noise on stored data is substantially eliminated.

It is possible to modify the operation of the circuit described above by applying a constant voltage gate signal to the gates 3 and 11 instead of a pulsed timing signal. The constant voltage may, of course, be taken from the power supply 20.

FIG. 4 shows the circuit of FIG. 3 in the form of an integrated circuit device. It includes an N-type silicon substrate 7 common to the three IGFETS 2, 5 and 11 having a concentration of $1 \times 10^{15}$ cm$^{-3}$. Six $p^+$ regions having a concentration of $1 \times 10^{19}$ cm$^{-3}$ and a silicon dioxide layer 16 are formed on one main surface of the substrate 7 by a conventional diffusion technique. These $p^+$ regions form the source 6′ and the drain 6″ of the first IGFET 5, the source 8 and the drain 4 of the second IGFET 2, and the source 13 and the drain 14 of the third IGFET 10. The silicon dioxide layer 16 defines a plurality of holes for interconnections. Aluminum is evaporated on the silicon dioxide layer 16 and in the holes, and aluminum interconnections 15 and gate electrodes 3 and 11 are then formed by a photo-etching technique. The input terminal 1 is connected to the source 13 of the third IGFET 10.

If a spurious signal of positive polarity reaches the input terminal 1 causing an injection of holes from the source 13 into the substrate 7, an injection of holes does not occur at the junction between the drain 14 and the substrate 7, or at the junction between the source 8 and the substrate 7. Moreover, the maximum distance that the injected holes diffuse without recombination is about 100 microns. Therefore, if the distance between the source 13 and the drain 4 is greater than 100 microns, substantially all of the injected holes from the source 13 recombine with electrons of the substrate 7 before reaching the drain 4. As a result, the data stored by the gate capacitance of the first IGFET 5 is maintained, irrespective of noise. Further, because the switching speed of each IGFET is high, the switching speed of the circuit can be maintained without sacrificing other desired characteristics of the circuit.

I have found that a noise signal of as much as +13 volts applied to the input terminal 1 through a resistor of 50 kilo ohms using a device having the source 13, 200 microns from the drain 4, has no observable effect on the stored data.

Instead of using a timing signal generator 23, a predetermined value of constant negative voltage may be applied to the gate 11 of the third IGFET 10 shown in FIG. 4. Although the third IGFET 10 is then always in conductive state, a resistance component of fixed value exists between the source 13 and the drain 14. Positive noise applied to the input terminal 1, therefore, produces a current flow from the source 13 to the substrate 7. The carriers injected into the substrated 7 recombine and do not reach the drain 4 as in the first embodiment. Accordingly, the effect of noise on stored data in the first IGFET 5 is substantially eliminated.

The temporary memory circuit shown in FIG. 3 may be constructed using a combination of separate first, second and third IGFETs instead of the integrated construction shown in FIG. 4. In a non-integrated device, the carriers injected into the substrate from the source region of the third IGFET 10 do not reach the drain region of the second IGFET 2 without recombination, because the substrates of the second and third IGFET's 2 and 10 are separated and electrically connected by external wiring. Therefore, noise does not affect the stored data.

In a non-integrated device, in which at least the third IGFET 10 is disposed on the semiconductor substrate separately from those of other IGFET's, the same effect is obtained regardless of whether timing pulses or a constant voltage is applied to the gate 11 of the third IGFET 10.

Although an embodiment of the invention utilizing P-channel IGFET's has been described here, N-channel IGFET's can be employed in a similar manner. It should also be noted that the aluminum interconnections 15, shown in FIGS. 2 and 4, may be replaced by highly diffused layers of the same conductivity as the source and drain regions.

It will be understood by those skilled in the art that these and other modifications and variations may be made without departing from the spirit and scope of the invention. Therefore, the invention is not deemed to be limited except as defined by the appended claims.

I claim:

1. A memory circuit comprising:

a semiconductor substrate of a first conductivity type;

at least six regions of a second conductivity type, each of said regions having a common surface with said substrate, a first pair within said six regions forming the source and drain electrodes of a first insulated gate field effect transistor, a second pair within six regions forming the source and drain electrodes of a second insulated gate field effect transistor, and a third pair within said six regions forming the source and drain electrodes of a third insulated gate field effect transistor;

said first, second and third transistors each having a gate electrode disposed over said substrate in an area lying between the source and drain electrodes formed by said first, second and third pairs of regions respectively;

insulator films inserted between electrodes and said substrate;

three electrical connection means disposed, respectively, between said drain region of said third transistor and said source electrode of said second transistor, between said drain electrode of said second transistor and said gate electrode of said first transistor, and between said source electrode of said first transistor and said substrate;

a resistive load connected to said drain electrode of said first transistor;

an input terminal connected to said source electrode of said third transistor;

an output terminal connected to said drain electrode of said first transistor;

a timing signal generator means for applying a timing signal to said gate electrode of said second transistor;

means for applying a gate signal connected to said gate electrode of said third transistor; and a power supply for applying a voltage between said substrate and said resistive load.

2. A memory circuit as set forth in claim 1, wherein said gate signal is said timing signal from said timing signal generator means.

3. A memory circuit as claimed in claim 1, wherein said means for applying a gate signal applies a gate signal of constant voltage.

* * * * *